(12) United States Patent
Gong et al.

(10) Patent No.: US 8,885,530 B2
(45) Date of Patent: Nov. 11, 2014

(54) METHOD AND SYSTEM FOR POWER MANAGEMENT IN AN AD HOC NETWORK

(75) Inventors: Michelle Gong, Sunnyvale, CA (US); Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 12/647,183

(22) Filed: Dec. 24, 2009

(65) Prior Publication Data

US 2011/0158142 A1 Jun. 30, 2011

(51) Int. Cl.
| | | |
|---|---|---|
| G08C 17/00 | (2006.01) |
| H04W 52/02 | (2009.01) |
| H04W 72/04 | (2009.01) |
| H04B 1/38 | (2006.01) |
| H04B 7/00 | (2006.01) |
| H04W 52/54 | (2009.01) |
| H04W 76/04 | (2009.01) |
| H04W 52/38 | (2009.01) |

(52) U.S. Cl.
CPC .......... *H04W 52/54* (2013.01); *H04W 52/0216* (2013.01); *H04W 76/048* (2013.01); *H04W 52/383* (2013.01); *H04W 52/0206* (2013.01)
USPC .......... 370/311; 370/318; 370/338; 455/13.4; 455/343.2; 455/522; 455/574

(58) Field of Classification Search
USPC .......... 370/311, 329, 338; 455/450, 509, 517, 455/522, 574, 343.3
See application file for complete search history.

(56) References Cited

U.S. PATENT DOCUMENTS

| | | | |
|---|---|---|---|
| 7,369,518 B2 | 5/2008 | Lee | |
| 7,412,265 B2* | 8/2008 | Chen et al. | 455/574 |
| 7,570,613 B2* | 8/2009 | Benveniste | 370/328 |
| 7,594,125 B2 | 9/2009 | Zhong | |
| 7,603,146 B2* | 10/2009 | Benveniste | 455/574 |
| 7,656,831 B2* | 2/2010 | Gao et al. | 370/311 |
| 7,660,578 B2* | 2/2010 | Viitamaki et al. | 455/426.2 |
| 7,668,128 B1* | 2/2010 | Benveniste | 370/311 |

(Continued)

FOREIGN PATENT DOCUMENTS

| | | |
|---|---|---|
| CN | 101023629 A | 8/2007 |
| JP | 2008547326 | 12/2008 |
| WO | 2006/033421 A1 | 3/2006 |
| WO | 2007002363 A2 | 1/2007 |

OTHER PUBLICATIONS

International Search Report and Written Opinion Received for PCT Patent Application No. PCT/US2010/059192, mailed on Sep. 21, 2011.

(Continued)

*Primary Examiner* — Alpus H Hsu
(74) *Attorney, Agent, or Firm* — Shichrur & Co.

(57) ABSTRACT

A method and system may transmit during a traffic indication window, such as an ATIM window, a frame indicating a power management mode and may then transition to the power management mode, possibly before the end of the traffic indication window. Another method and system may receive or transmit during a beacon interval an indicator of a desire to enter a sleep state, then transmit or receive an indicator of a desire to enter the sleep state, and then enter the sleep state prior to the end of the beacon interval. Other embodiments are described and claimed.

15 Claims, 6 Drawing Sheets

(56) References Cited

U.S. PATENT DOCUMENTS

| | | | |
|---|---|---|---|
| 7,756,103 B2 * | 7/2010 | Alon et al. | 370/349 |
| 7,796,545 B2 * | 9/2010 | Surineni et al. | 370/278 |
| 7,813,307 B2 * | 10/2010 | Kakani | 370/311 |
| 7,848,277 B2 * | 12/2010 | Chou et al. | 370/318 |
| 7,904,023 B2 * | 3/2011 | Viitamaki et al. | 455/41.2 |
| 7,949,376 B2 * | 5/2011 | Maekawa | 455/574 |
| 8,014,369 B2 * | 9/2011 | Chou | 370/338 |
| 8,064,374 B2 * | 11/2011 | Kakani et al. | 370/311 |
| 8,098,614 B1 * | 1/2012 | Wang | 370/318 |
| 8,451,761 B2 * | 5/2013 | Seok | 370/311 |
| 2004/0228293 A1 | 11/2004 | Choi et al. | |
| 2005/0049012 A1 | 3/2005 | Chang et al. | |
| 2005/0143145 A1 * | 6/2005 | Maekawa | 455/574 |
| 2005/0233789 A1 * | 10/2005 | Maekawa | 463/1 |
| 2006/0028984 A1 | 2/2006 | Wu et al. | |
| 2006/0056322 A1 * | 3/2006 | Simpson et al. | 370/278 |
| 2006/0193296 A1 * | 8/2006 | Zhong et al. | 370/338 |
| 2006/0193315 A1 | 8/2006 | Sinivaara et al. | |
| 2006/0285527 A1 | 12/2006 | Gao et al. | |
| 2006/0285528 A1 * | 12/2006 | Gao et al. | 370/338 |
| 2007/0133448 A1 * | 6/2007 | Gao et al. | 370/311 |
| 2007/0147321 A1 * | 6/2007 | Jung | 370/338 |
| 2007/0207765 A1 | 9/2007 | Nakahara et al. | |
| 2007/0230418 A1 * | 10/2007 | Takeuchi et al. | 370/338 |
| 2007/0242634 A1 * | 10/2007 | Calcev et al. | 370/318 |
| 2007/0293218 A1 * | 12/2007 | Meylan et al. | 455/434 |
| 2008/0095091 A1 | 4/2008 | Surineni et al. | |
| 2008/0125190 A1 | 5/2008 | Jan et al. | |
| 2008/0181154 A1 * | 7/2008 | Sherman | 370/311 |
| 2008/0219228 A1 * | 9/2008 | Seok et al. | 370/338 |
| 2008/0310391 A1 * | 12/2008 | Schneidman et al. | 370/349 |
| 2009/0067373 A1 * | 3/2009 | Kneckt et al. | 370/328 |
| 2009/0097428 A1 * | 4/2009 | Kneckt et al. | 370/311 |
| 2009/0124301 A1 * | 5/2009 | Raissinia | 455/574 |
| 2009/0196212 A1 * | 8/2009 | Wentink | 370/311 |
| 2009/0252135 A1 * | 10/2009 | Benveniste | 370/338 |
| 2009/0268652 A1 * | 10/2009 | Kneckt et al. | 370/311 |
| 2010/0008274 A1 * | 1/2010 | Kneckt et al. | 370/311 |
| 2010/0165896 A1 * | 7/2010 | Gong et al. | 370/311 |

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY)Specifications IEEE Std 802.11 ™-2007, (Revision of IEEE Std 802.11-1999); 1184 pages.

John Dorsey and Dan Siewiorek, "802.11 Power Management Extensions to Monarch ns", Dec. 2004 CMU-CS-04-183; School of Computer Science, Carnegie Mellon University Pittsburgh, PA 15213; 47 pages.

Sweta Sarkar, "Power Management in 802.11", Jun. 17, 2002; 8 pages.

Office Action received for Chinese Patent Application No. 201010624997.X, mailed on Jan. 31, 2013, 14 pages of office action including 8 pages of English translation.

International Preliminary Report on Patentability of International PCT Application No. PCT/US2010/059192, mailed Jul. 5, 2012; 6 pages.

Extended European Search Report for European Patent Application No. 10839977.5, mailed on Jul. 8, 2013, 8 pages.

Office Action for Chinese Patent Application No. 201010624997.X, mailed on Jul. 25, 2013, 14 pages, including 8 pages of English translation.

Office Action for Japanese Patent Application No. 2012-535463, mailed on Jul. 23, 2013, 4 pages, including 2 pages of English translation.

Office Action for Chinese Patent Application No. 201010624997.X, mailed on Dec. 3, 2013, 15 pages, including 9 pages of English translation.

Office Action for European Patent Application No. 10839977.5, mailed on Feb. 25, 2014, 4 pages.

Office Action for Chinese Patent Application No. 201010624997.X, mailed on Jul. 18, 2014, 12 pages, including 7 pages of English translation.

* cited by examiner

METHOD AND SYSTEM FOR POWER MANAGEMENT IN AN AD HOC NETWORK

BACKGROUND

Electronic devices such as wireless stations often operate in a network communicating with each other. For more interoperability, these stations may communicate according to a standard protocol, such as the IEEE 802.11 standard as described in one or more specifications such as "IEEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE Std 802.11-2007, published Jun. 12, 2007. These wireless stations often are mobile and may manage their power modes.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features, and advantages thereof, may best be understood by reference to the following detailed description when read with the accompanied drawings in which:

Figure 1A:
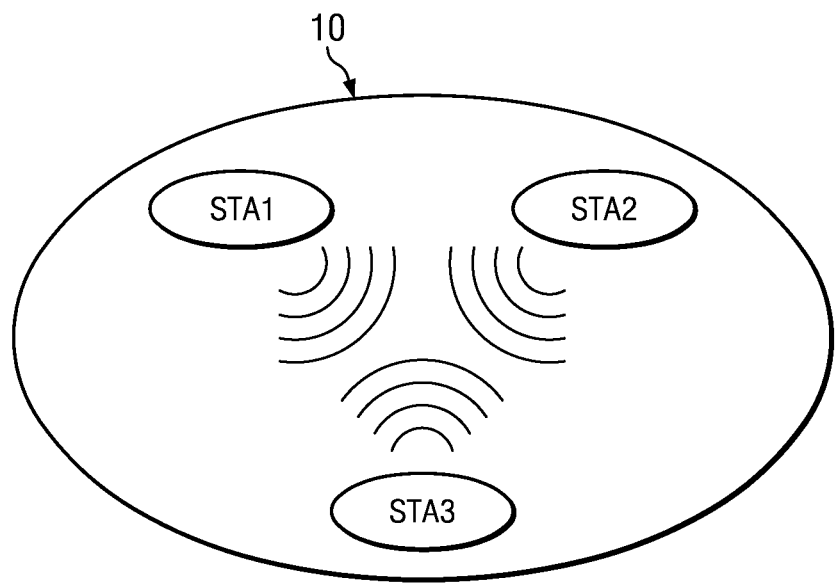
FIG. 1A is a conceptual illustration of an ad hoc network according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission, or display devices. In addition, the term "plurality" may be used throughout the specification to describe two or more components, devices, elements, parameters, and the like.

Embodiments of the present invention may be used in a variety of applications. Although the present invention is not limited in this respect, the circuits and techniques disclosed herein may be used in many apparatuses such as personal computers (PCs), wireless devices or stations, video or digital game devices or systems, image collection systems, processing systems, visualizing or display systems, digital display systems, communication systems, and the like.

Reference is now made to FIG. 1A, a conceptual illustration of a network 10 capable of operating in a wireless mode according to embodiments of the invention. Network 10 may be a wireless network, a wireless local area network (WLAN), a peer-to-peer network, an ad hoc network, or an independent basic service set (IBSS) that may operate according to IEEE 802.11 standard ("802.11"). (These networks and network types are not mutually exclusive.) Although the invention is not limited in this respect, network 10 may include a plurality of stations (called "STA" in 802.11) STA1, STA2, STA3 (or more or fewer stations) that are capable of communicating with each other wirelessly. STAs 1, 2, 3 can be personal computers (PCs) with wireless adapters, wireless devices, cell phones, personal digital assistants (PDAs), printers, display systems, image collection and/or processing systems, just to name a few. Other network devices may also be included in network 10.

Figure 1B:
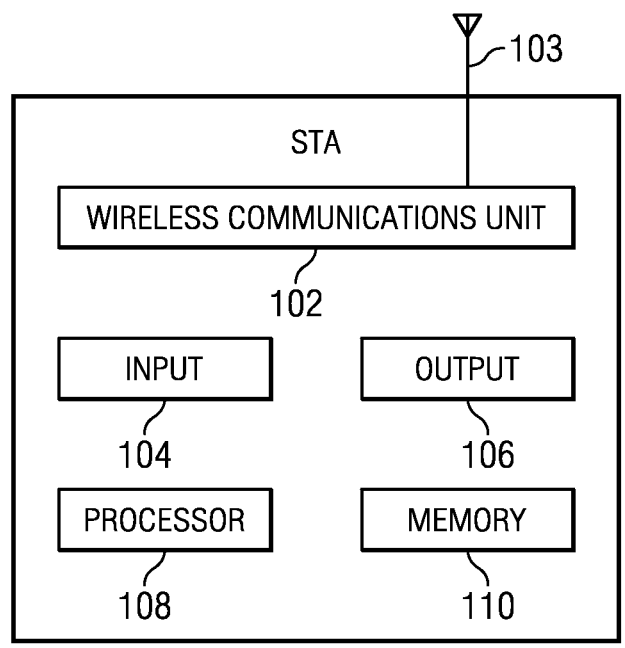
FIG. 1B is a conceptual illustration of a station within an ad hoc network according to embodiments of the invention.

Reference is now made to FIG. 1B, which is a conceptual illustration of a station STA (e.g., STA1, 2, or 3) within network 10, according to embodiments of the invention. Such station may include wireless communications unit 102 (coupled to antenna 103), input 104, output 106, processor 108, and memory 110. Using such blocks, STA may communicate with other stations and other wireless devices according to embodiments of the invention, such as by using processor 108 and wireless communications unit 102 (and possibly antenna 103) to transmit and/or receive signals. Input 104 and output 106 may also be used to communicate with other devices. Memory 110 may be a computer or processor readable medium or a computer or processor storage medium, such as, for example, a RAM or RAM, a disk drive, or a USB flash memory.

Figure 2A:
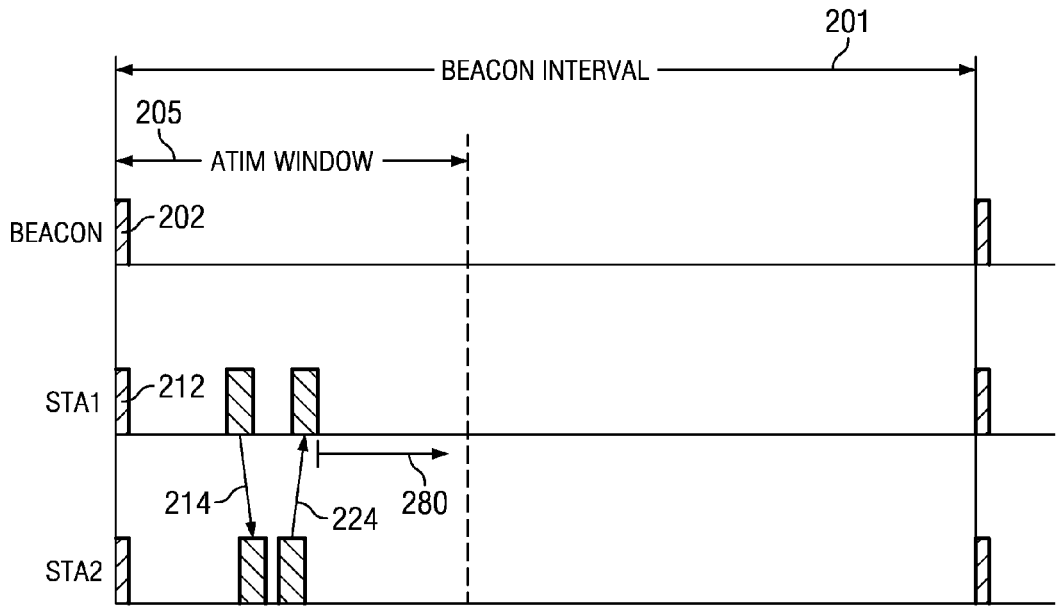
FIGS. 2A-2C are timing diagrams illustrating embodiments of the invention.
Figure 2B:
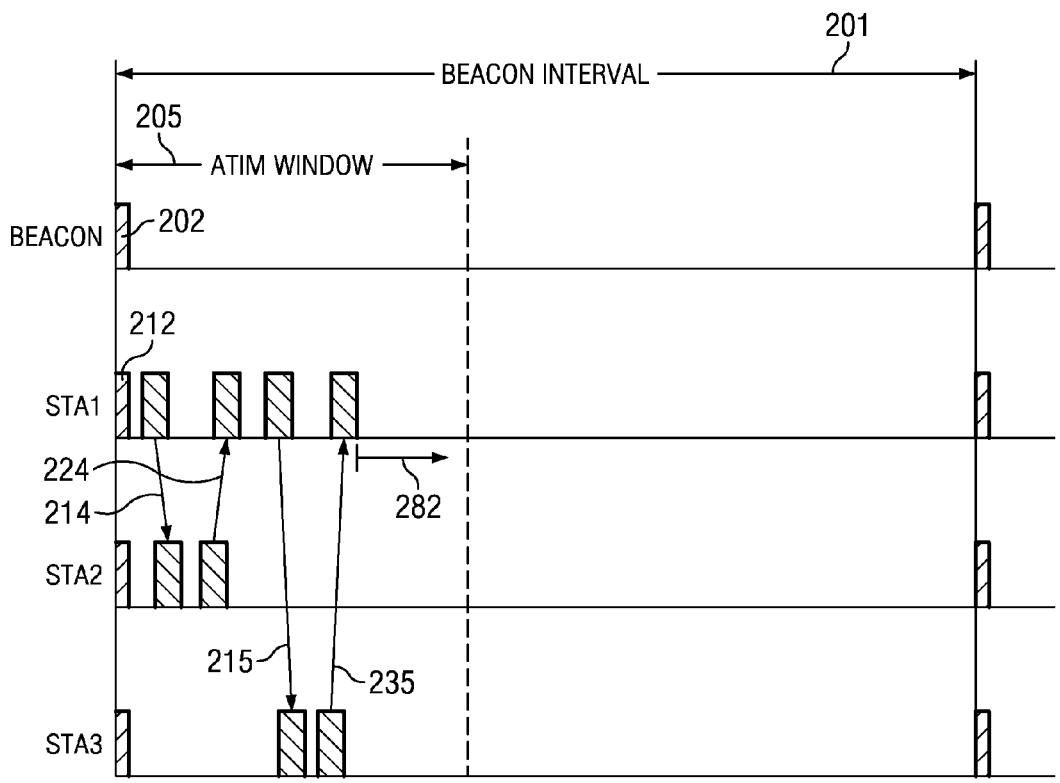
Figure 2C:
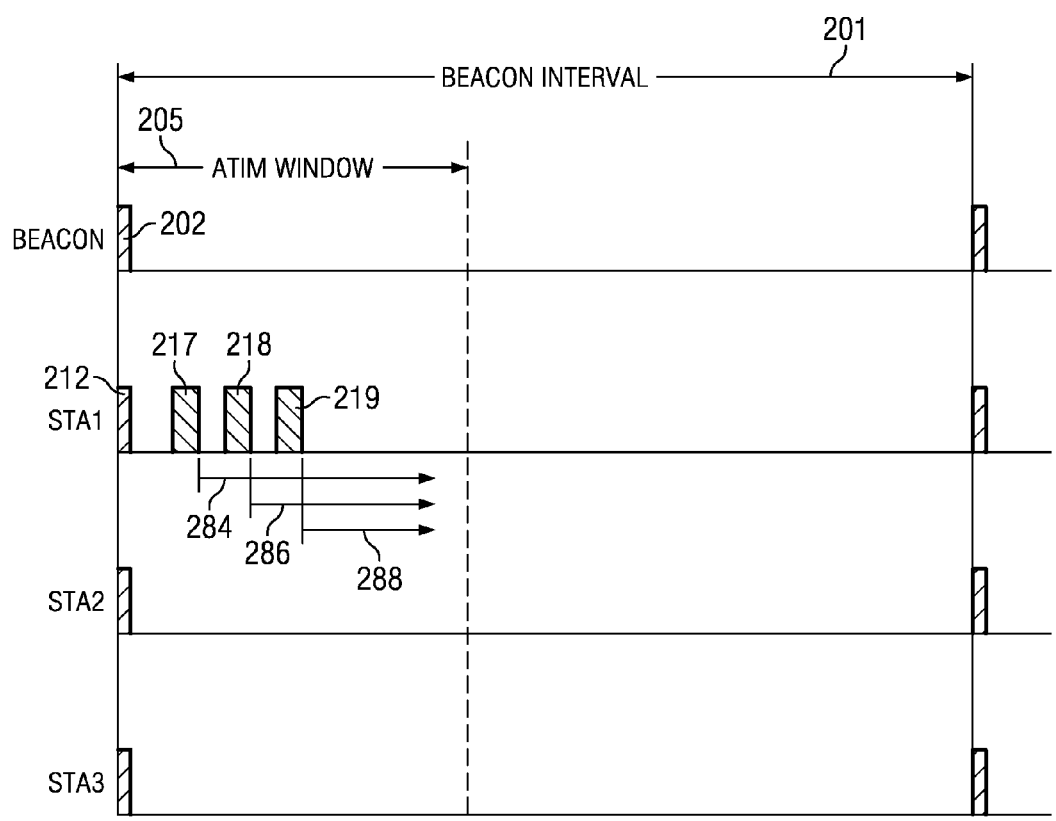

Reference is now made to FIGS. 2A-2C, which are timing diagrams illustrating embodiments of the invention. FIG. 2A shows a beacon interval 201, at the beginning of which beacon (or beacon frame) 202 is transmitted. The "beacon interval," also known as the target beacon transmission time (TBTT), is one of the bases for timing of packet transmission in 802.11. At the beginning of beacon interval 201 is announcement traffic indication message (ATIM, also called "ad-hoc traffic indication message") window 205. ATIM window 205 is the part of the beacon interval in which wireless STAs may signal to each other that there is data to be transmitted from one STA to another.

In a wireless network such as network 10, STAs may be in a power-saving or an "active" mode. In a power-saving mode, the STA is sometimes awake and sometimes asleep (often called "doze" or "sleep" or "standby" states). In this mode, STAs wake up just prior to the beacon interval and look to see whether other STAs want to transmit data to them, as indicated by another STA transmitting an ATIM frame (also called an "ATIM management frame" or simply an "ATIM") during the ATIM window. If no ATIM frame is transmitted to the STA, and the STA does not want to transmit data to other STAs, the STA can go back to the doze state at the end of the ATIM window. In active mode, the STA is awake all the time.

In one embodiment of the present invention, a STA, e.g., STA1, may communicate to the other STAs in the network a change in its power management mode (to power-saving or to active mode). As shown illustratively in FIG. 2A, after beacon 212, STA1 may transmit null data frame 214 within ATIM window 205. Null data frame 214 (which can be a non-QoS (quality of service) or a QoS (quality of service) null data frame) includes only a frame header (no frame body), which contains significantly fewer bits than a full frame. Within null data frame 214 may be a power management bit indicating that the STA is transitioning to power-saving mode (e.g., if the bit=1) or is transitioning to active mode (e.g., if the bit=0). The power management (PM) bit in data frames indicates the power management mode in which the STA will be at the end of the frame exchange.

If STA2 receives null data frame 214, in response it may transmit back to STA1 acknowledgment frame 224. Once STA1 receives acknowledgment frame 224, STA1 may enter or transition to the different power management mode 280 (e.g., to power-saving mode or to active mode). If the change is to power-saving mode, STA1 may enter the doze state after the end of ATIM window 205.

Transmitting a null data frame during the ATIM window may reduce overhead compared with transmitting an ATIM frame and a null data frame after the ATIM window. In addition, since all STAs are awake during the ATIM window, all STAs will be aware of the power management mode transition announcement. If a power management mode transition announcement were made using an ATIM frame and a null data frame after the ATIM window, STAs that have returned to the doze state would not be aware of such transition announcement. Other or different benefits may also be achieved.

If there are more than two STAs, STA1 may announce a change in its power management mode to the other STAs in a similar manner. As shown illustratively in FIG. 2B, STA1 may transmit null data frame 214 within ATIM window 205 to STA2 and null data frame 215 to STA3, where the power management bit of frames 214 and 215 may be the same. STA2 receives null data frame 214 and in response may transmit back to STA1 acknowledgment frame 224, and STA3 receives null data frame 215 and in response may transmit back to STA1 acknowledgment frame 235. Once STA1 receives acknowledgment frames 224 and 235, STA1 may enter or transition to the different power management mode 282. If the change is to power-saving mode, STA1 may enter the doze state after the end of ATIM window 205.

FIGS. 2A and 2B illustrate a unicast manner of transmission of a change in a station's power management mode. Alternatively, STA1 could announce a change in its power management mode to the other STAs in a broadcast or multicast manner. As shown illustratively in FIG. 2C, STA1 may broadcast null data frame 217 within ATIM window 205 to all the other STAs in network 10. STA1 may enter or transition to the different power management mode 284 immediately after broadcast of null data frame 217.

In other embodiments, due to the possibility that not all of the STAs in network 10 receive null data frame 217, if STA1 wants to more reliably announce its power management mode change to the other STAs in network 10, STA1 may broadcast more than one null data frame (e.g., null data frames 217 and 218 and possibly 219 or more) within ATIM window 205 to all the other STAs in network 10 and then may enter or transition to the different power management mode 286 immediately after broadcast of null data frame 218 or the different power management mode 288 immediately after broadcast of null data frame 219. In each of these broadcast embodiments, if STA1 enters or transitions to power-saving mode, it may then enter the doze state after the end of ATIM window 205. Depending on how many times STA1 broadcasts a null data frame, other or different benefits may be achieved.

Figure 3A:
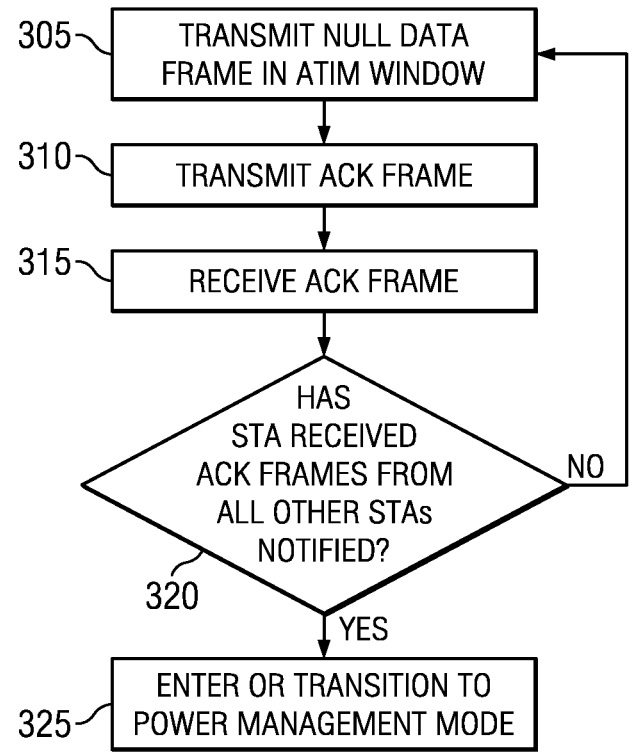
FIGS. 3A-3B are flowcharts of methods used according to embodiments of the invention.
Figure 3B:
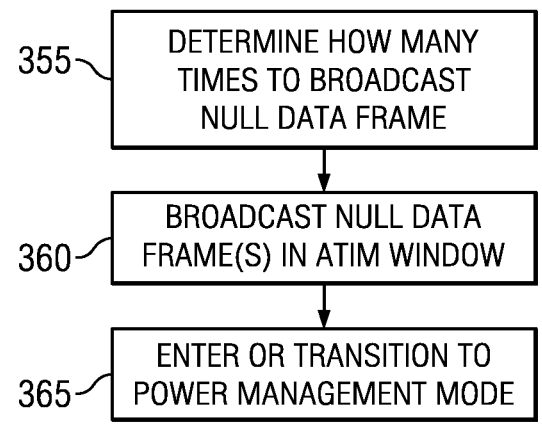

Reference is now made to FIGS. 3A and 3B, which show methods of announcing a change in a station's power management mode according to embodiments of the invention. Embodiments of the method may be used by, or may be implemented by, for example, STAs 1, 2, or 3 in network 10, or computing systems other suitable systems, or by other suitable wireless communication devices, stations, nodes, systems and/or networks.

In FIG. 3A, as indicated in operation 305, a station such as STA1, 2, or 3 may transmit to another STA in network 10 a null data frame during an ATIM window. This null data frame may include a power management bit indicating a change in power management mode. After receiving the null data frame, in operation 310 the receiving STA may transmit an acknowledgment frame back to the announcing STA, which receives the acknowledgment frame in operation 315. In operation 320, the announcing STA determines whether all STAs have been notified and all ACKs have been received. If not, the announcing STA returns to operation 305 and transmits a null data frame to another STA, which transmits its ACK frame (operation 310) to the announcing STA, which receives that ACK (operation 315). The loop continues if there are more STAs to be notified. If no more STAs need to be notified and all ACKs have been received, in operation 325 the announcing STA may enter or transition to the announced power management mode prior to the end of the ATIM window.

In FIG. 3B, as indicated in operation 355, a station such as STA1, 2, or 3 determines how many times it should broadcast a null data frame indicating a change in the announcing STA's power management mode, based on how reliably the announcing STA wants to announce its change. In operation 360, the announcing STA may broadcast during an ATIM window to all of the other STAs in network 10 one or more null data frames. In operation 365, the announcing STA may immediately (or after some time period) enter or transition to the announced power management mode prior to the end of the ATIM window.

Besides the flowcharts included in FIGS. 3A and 3B, other operations or series of operations may be used.

Returning to FIG. 1B, in accordance with embodiments of the invention, processor 108 and wireless communications unit 102 (and possibly antenna 103) within a STA may transmit during a traffic indication window (such as an ATIM window) a frame, such as a null data frame, indicating a power management mode, such as a power-saving or active mode, and processor 108 may cause the STA to transition to the power management mode.

In another embodiment of the present invention, a STA that is in power-saving mode may enter the doze or sleep state before the end of the beacon interval. It may do this by communicating to the other STAs in network 10 the desire to enter a sleep state, such as the doze state, for example by indicating the end of data transmission for that beacon interval. One indicator may be setting equal to 1 the end of service period (EOSP) bit in a QoS data (or null data) frame.

Figure 4A:
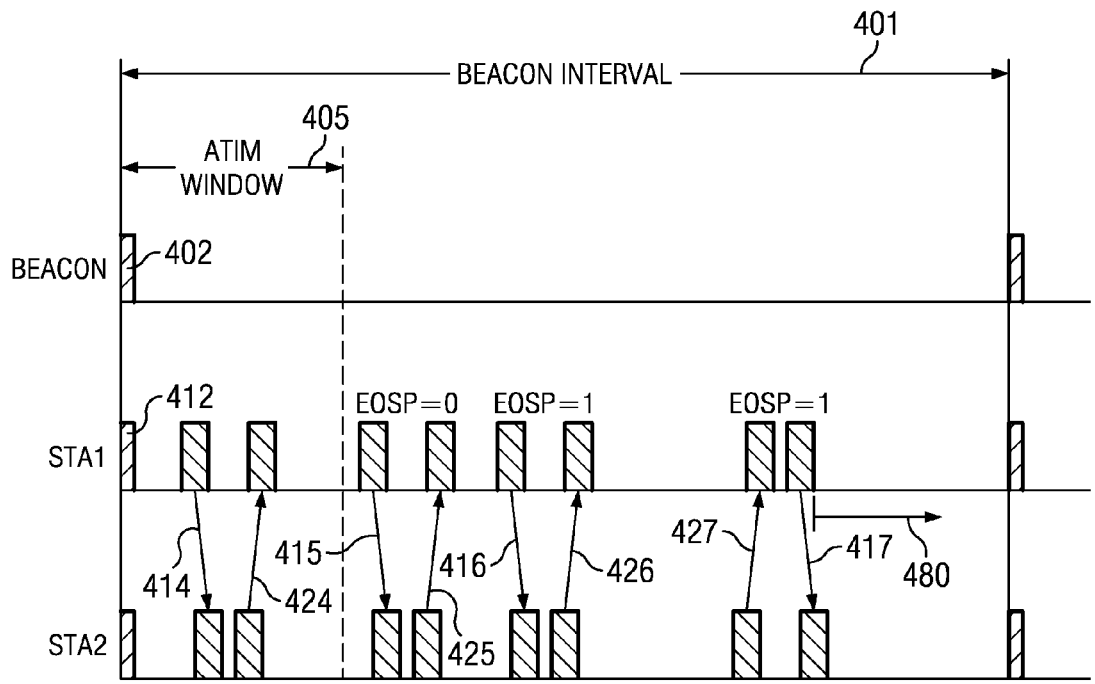
FIGS. 4A-4B are timing diagrams illustrating other embodiments of the invention.
Figure 4B:
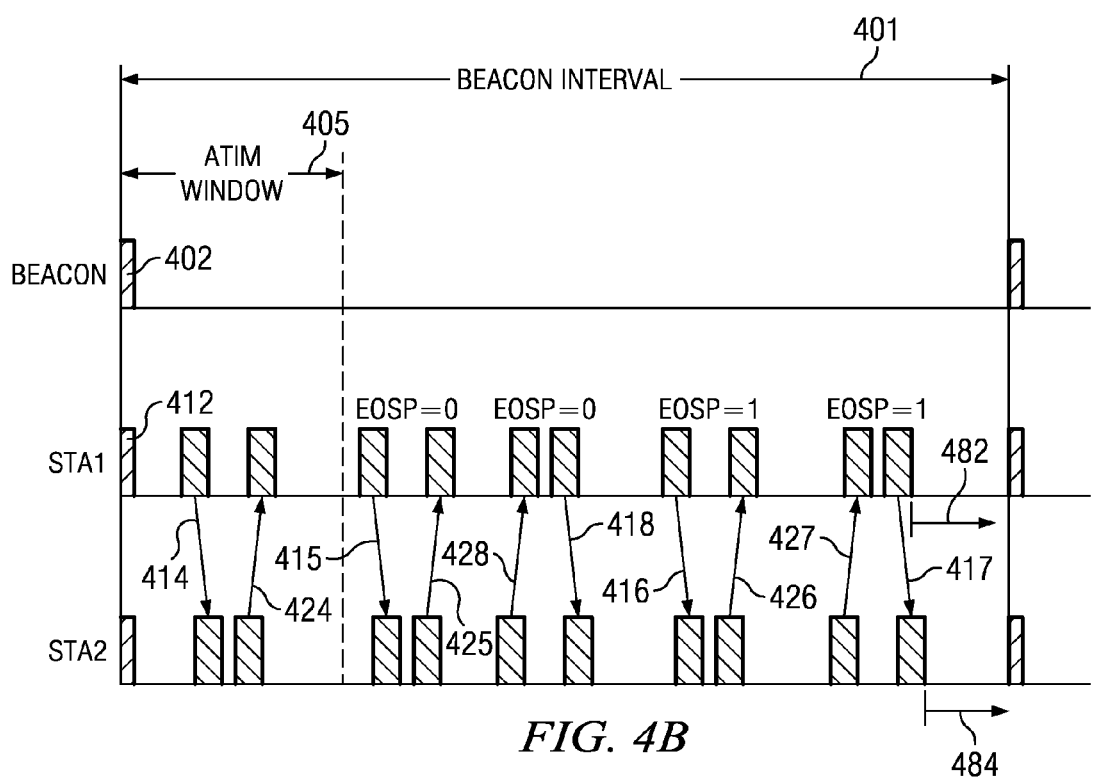

Reference is now made to FIGS. 4A-4B, which are timing diagrams illustrating embodiments of the invention. FIG. 4A shows a beacon interval 401, at the beginning of which beacon (or beacon frame) 402 is transmitted. At the beginning of beacon interval 401 is ATIM window 405. As before, ATIM window 405 is the part of the beacon interval in which wireless STAs may signal to each other that there is data to be transmitted from one STA to another.

As shown illustratively in FIG. 4A, after beacon 412, STA1, which may be in power-saving mode, may transmit ATIM frame 414 (also called an "ATIM management frame" or simply an "ATIM") within ATIM window 405. ATIM frame 414 indicates that there is data to be transmitted from STA1 to STA2. STA2 receives ATIM frame 414 and in response may transmit back to STA1 acknowledgment frame 424. STA2 may or may not be in power-saving mode.

After the end of ATIM window 405, STA1 may transmit to STA2 data frame 415 with its EOSP bit equal to 0. STA2 receives data frame 415 and in response may transmit back to STA1 acknowledgment frame 425. STA1 may have more data frames to transmit to STA2, in which case such frames may be transmitted with EOSP=0.

If there is just one more data frame for STA1 to transmit to STA2, and STA1 desires to enter the sleep state, STA1 may transmit to STA2 data frame 416 with its EOSP bit equal to 1, which is an example of an indicator of a desire to enter the sleep or doze state. STA2 receives data frame 416 and in response may transmit back to STA1 acknowledgment frame 426. STA2 then may transmit to STA1 data frame 427 with its EOSP bit equal to 1, and in response STA1 may transmit back to STA2 acknowledgment frame 417. Once a data frame with EOSP=1 has been transmitted to and received from STA2, STA1 may then enter doze state 480, even though it is prior to the end of beacon interval 401.

The mechanism just described operates in a similar manner if STA1 receives an ATIM frame rather than transmits ATIM frame 414. In such a case, after the end of ATIM window 405, STA2 may transmit to STA1 a data frame with EOSP=0, and STA1 may transmit back to STA2 an acknowledgment frame. STA2 may have more data frames to transmit to STA1, in which case such frames may also be transmitted with EOSP=0. If there is just one more data frame for STA2 to transmit to STA1, and STA2 desires to enter the sleep state, STA2 may transmit to STA1 a data frame with EOSP=1. In response, STA1 may transmit back to STA2 an acknowledgment frame and then may transmit to STA2 a data frame with EOSP=1. Once a data frame with EOSP=1 has been received from and transmitted to (or transmitted to and received from) STA2, STA1 may then enter doze state 480, even though it is prior to the end of beacon interval 401. In these embodiments, a data frame includes a null data frame.

FIG. 4A illustrates the situation when one station (e.g., STA1 or STA2) is in power-saving mode. Alternatively, both (or all) STAs could be in power-saving mode. As shown illustratively in FIG. 4B, after beacon 412, STA1 may transmit ATIM frame 414 within ATIM window 405. ATIM frame 414 may indicate that there is data to be transmitted from STA1 to STA2. In response, STA2 may transmit back to STA1 acknowledgment frame 424. After the end of ATIM window 405, STA1 may transmit to STA2 data frame 415 with EOSP=0, and STA2 may transmit in response to STA1 acknowledgment frame 425. If STA2 has data to transmit to STA1, STA2 may transmit to STA1 data frame 428 with EOSP=0, and STA1 may transmit in response to STA2 acknowledgment frame 418. STA1 and/or STA2 may have more data frames to transmit to the other station(s), in which case such frames may be transmitted with EOSP=0.

If there is just one more data frame for STA1 to transmit to STA2, and STA1 desires to enter the sleep state, STA1 may transmit to STA2 data frame 416 with EOSP=1. STA2 receives data frame 416 and in response may transmit back to STA1 acknowledgment frame 426. STA2 then may transmit to STA1 data frame 427 with EOSP=1, and in response STA1 may transmit back to STA2 acknowledgment frame 417. Once a data frame with EOSP=1 has been transmitted to and received from STA2, STA1 may then enter doze state 482, even though it is prior to the end of beacon interval 401. Similarly, if there are no more data frames for STA2 to transmit to STA1, then STA2 may then enter doze state 484, since a data frame with EOSP=1 has been received from and transmitted to STA1, even though it is prior to the end of beacon interval 401. This early entry into the doze state may save power for battery-powered STAs. Other or different benefits may also be achieved.

As before, the mechanism just described operates in a similar manner if STA1 receives an ATIM frame rather than transmits ATIM frame 414. The stations transmit data frames to each other, with EOSP=0. As an indicator of a desire to enter the sleep state, the last data frames may be transmitted with EOSP=1, indicating the end of service period. After a data frame with EOSP=1 has been received from and transmitted to (or transmitted to and received from) the other station, each station may then enter the doze state, even though it is prior to the end of beacon interval 401.

Figure 5:
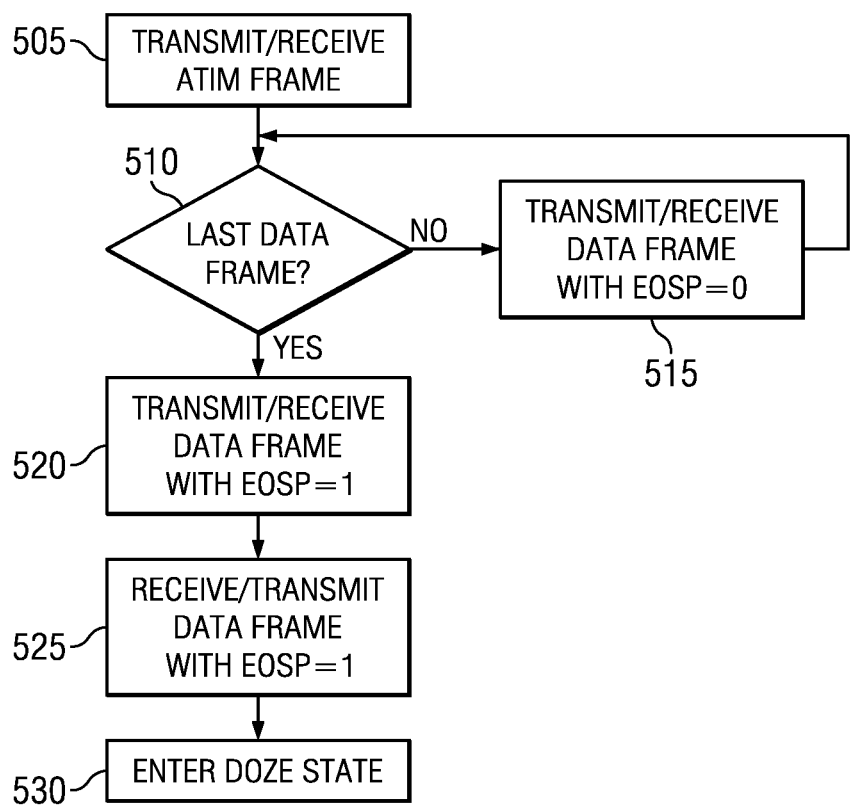
FIG. 5 is a flowchart of methods used according to other embodiments of the invention.

Reference is now made to FIG. 5, which shows how the STAs may enter the sleep state according to embodiments of the invention. These embodiments may be used by, or may be implemented by, for example, STAs 1, 2, or 3 in network 10, or computing systems other suitable systems, or by other suitable wireless communication devices, stations, nodes, systems and/or networks.

In FIG. 5, as indicated in operation 505, a station such as STA1, 2, or 3 may transmit to another STA in network 10 an ATIM frame during an ATIM window. The receiving station then may transmit an acknowledgment frame in response. In operation 510, the transmitting STA may query whether there is only one more data frame to be transmitted to the other STA. If not, in operation 515 the STA may transmit to the other STA a data frame with its EOSP bit equal to 0. The method then returns to operation 510 to query whether there is only one more data frame to be transmitted to the other STA. This loop continues (transmitting data frames with EOSP=0) until the last data frame is about to be transmitted. In that case, in operation 520, if the STA desires to enter the sleep state, the STA transmits to the other STA a data frame with its EOSP bit equal to 1, which is an example of an indicator of a desire to enter a sleep state such as the doze state. The other STA then transmits to the first STA a data frame with its EOSP bit equal to 1 in operation 525. In operation 530, one or more of the STAs then may enter the doze state prior to the end of the beacon interval.

The method shown in FIG. 5 may be varied a number of ways, depending on which station's point of view is the reference. Operation 505, for example, may be the transmission of an ATIM frame by STA1 or the reception of an ATIM frame by STA2. Similarly, operation 515 may be the transmission by STA1 of a data frame with EOSP=0 or the reception of a data frame with EOSP=0 by STA2. And operation 520 may be the transmission by STA1 of a data frame with EOSP=1 or the reception by STA2 of a data frame with EOSP=1. Operation 525 may then be the complement of operation 520, with transmission by STA2 of a data frame with EOSP=1 or the reception of a data frame with EOSP=1 by STA1. In operation 530, the STAs that may enter the doze state before the end of the beacon interval will thus have had both transmitted and received a data frame with EOSP=1.

Other scenarios may occur. In one example, if a station (e.g., STA1) does not receive EOSP=1 from another station (e.g., STA2) but successfully transmits EOSP=1 to STA2, STA1 may wait until a timeout period expires before entering the doze state. In another example, if STA1 cannot successfully transmit EOSP=1 (e.g., if no acknowledgment is received from STA2 for the last frame), STA1 may retransmit the last frame at least one more time, and then enter the doze state when it receives acknowledgment from STA2. This retransmission may be subject to an applicable retry or lifetime limit.

Besides the flowchart in FIG. 5 and other scenarios described above, other operations or series of operations may be used. Moreover, the actual order of the operations is not critical. A STA may first receive a data frame with EOSP=1 and then transmit a data frame with EOSP=1, before entering the doze state; alternatively, the STA may first transmit a data frame with EOSP=1 and then receive a data frame with EOSP=1, before entering the doze state.

Returning to FIG. 1B, in accordance with embodiments of the invention, processor 108 and wireless communications unit 102 (and possibly antenna 103) within a STA may also receive and/or transmit during a beacon interval an indicator of a desire to enter a sleep or doze state and to transmit or receive during the beacon interval an indicator of a desire to enter the sleep state, where processor 108 may cause STA to enter the sleep state prior to the end of the beacon interval. The indicator may be included in the EOSP field within a data frame.

Embodiments of the invention may include an article such as a computer or processor readable medium, or a computer or processor storage medium, such as, for example, a memory, a disk drive, or a USB flash memory encoding, including, or storing instructions that, when executed by a processor or controller, carry out methods disclosed herein. Such embodiments may also be delivered and/or transferred to a computer via a network such as the Internet.

While the invention has been described with respect to a limited number of embodiments, it will be appreciated that many variations, modifications, and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
   during an announcement traffic indication message (ATIM) window of a beacon interval, transmitting an ATIM frame from a first station to a second station, and receiving at the first station an acknowledgement frame from the second station;
   during a time period following said ATIM window within said beacon interval, querying at said first station whether or not there is only one data frame to be transmitted to said second station;
   if there is more than one data frame to be transmitted, transmitting to the second station a data frame including an end of service period (EOSP) field including a first predefined value and repeating said querying;
   if there is only one data frame to be transmitted, transmitting to the second station the one data frame including the EOSP field including a second predefined value, different from said first value, prior to the end of the beacon interval;
   receiving at the first station a data frame from the second station including the EOSP field including the second predefined value, prior to the end of the beacon interval; and
   entering a sleep state at said first station after receiving said data frame from said second station including the EOSP field including the second predefined value, and prior to the end of the beacon interval.

2. The method of claim 1 comprising, prior to the end of the beacon interval and prior to transmitting the one data frame with the EOSP field including the second predefined value, receiving at the first station a data frame from the second station with the EOSP field including the first predefined value.

3. The method of claim 2 comprising transmitting an acknowledgement from the first station to the second station, in response to the data frame from the second station including the EOSP field with the first predefined value.

4. The method of claim 1 comprising communicating between the first and second stations within an independent basic service set (IBSS).

5. The method of claim 1, wherein said first predefined value comprises the value of zero, and wherein said second predefined value comprises the value of one.

6. A system comprising:
   a first wireless communication device including:
   a processor; and
   a wireless communication unit,
   wherein, during an announcement traffic indication message (ATIM) window of a beacon interval, said wireless communication unit is to transmit an ATIM frame to a second wireless communication device, and to receive an acknowledgement frame from the second wireless communication device,
   wherein, during a time period following said ATIM window within said beacon interval, said wireless communication unit is to query whether or not there is only one data frame to be transmitted to said second wireless communication device,
   if there is more than one data frame to be transmitted, said wireless communication unit is to transmit to the second wireless communication device a data frame including an end of service period (EOSP) field including a first predefined value, and to repeat said querying,
   if there is only one data frame to be transmitted, said wireless communication unit is to transmit to the second wireless communication device the one data frame including the EOSP field including a second predefined value, different from said first value, prior to the end of the beacon interval,
   wherein said wireless communication unit is to receive a data frame from the second wireless communication device including the EOSP field including the second predefined value, prior to the end of the beacon interval, and
   wherein said wireless communication unit is to enter a sleep state after receiving said data frame from said second wireless communication device including the EOSP field including the second predefined value, and prior to the end of the beacon interval.

7. The system of claim 6, wherein, prior to the end of the beacon interval and prior to transmitting the one data frame with the EOSP field including the second predefined value, the wireless communication unit is to receive from the second wireless communication device a data frame with the EOSP field including the first predefined value.

8. The system of claim 7, wherein said wireless communication unit is to transmit an acknowledgement to the second wireless communication device, in response to the data frame from the second wireless communication device with the EOSP field including the first predefined value.

9. The system of claim 6, wherein said first predefined value comprises the value of zero, and wherein said second predefined value comprises the value of one.

10. The system of claim 6, wherein said wireless communication unit is to communicate with said second wireless communication device within an independent basic service set (IBSS).

11. A device comprising:
one or more antennas; and
a wireless communication unit,
wherein, during an announcement traffic indication message (ATIM) window of a beacon interval, said wireless communication unit is to transmit an ATIM frame to a wireless communication device, and to receive an acknowledgement frame from the wireless communication device;
wherein, during a time period following said ATIM window within said beacon interval, said wireless communication unit is to query whether or not there is only one data frame to be transmitted to said wireless communication device;
if there is more than one data frame to be transmitted, said wireless communication unit is to transmit to the wireless communication device a data frame including an end of service period (EOSP) field including a first predefined value, and to repeat said querying,
if there is only one data frame to be transmitted, said wireless communication unit is to transmit to the wireless communication device the one data frame including the EOSP field including a second predefined value, different from said first value, prior to the end of the beacon interval;
wherein said wireless communication unit is to receive a data frame from the wireless communication device including the EOSP field including the second predefined value, prior to the end of the beacon interval; and
wherein said wireless communication unit is to enter a sleep state after receiving said data frame from said wireless communication device including the EOSP field including the second predefined value, and prior to the end of the beacon interval.

12. The device of claim 11, wherein, prior to the end of the beacon interval and prior to transmitting the one data frame with the EOSP field including the second predefined value, the wireless communication unit is to receive from the wireless communication device a data frame with the EOSP field including the first predefined value.

13. The device of claim 12, wherein said wireless communication unit is to transmit an acknowledgement to the wireless communication device, in response to the data frame from the wireless communication device with the EOSP field including the first predefined value.

14. The device of claim 11, wherein said first predefined value comprises the value of zero, and wherein said second predefined value comprises the value of one.

15. The device of claim 11, wherein said wireless communication unit is to communicate with said wireless communication device within an independent basic service set (IBSS).

* * * * *